United States Patent
Oyama et al.

(10) Patent No.: US 10,476,085 B2
(45) Date of Patent: Nov. 12, 2019

(54) SEPARATOR FOR FUEL CELLS AND METHOD FOR PRODUCING SAME

(71) Applicants: HONDA MOTOR CO., LTD., Minato-Ku, Tokyo (JP); NOK CORPORATION, Minato-Ku, Tokyo (JP)

(72) Inventors: Satoshi Oyama, Wako (JP); Go Morimoto, Wako (JP); Satoru Terada, Wako (JP); Shuhei Goto, Wako (JP); Akihito Giga, Wako (JP); Takahiro Hayashi, Fujisawa (JP); Takeshi Masaka, Kakegawa (JP); Satomi Yogo, Fujisawa (JP); Shotaro Koga, Kakegawa (JP)

(73) Assignees: Honda Motor Co., Ltd., Tokyo (JP); NOK Corporation, Tokyo (JP)

(*) Notice: Subject to any disclaimer, the term of this patent is extended or adjusted under 35 U.S.C. 154(b) by 0 days.

(21) Appl. No.: 15/562,141

(22) PCT Filed: Mar. 22, 2016

(86) PCT No.: PCT/JP2016/058939
§ 371 (c)(1),
(2) Date: Sep. 27, 2017

(87) PCT Pub. No.: WO2016/158556
PCT Pub. Date: Oct. 6, 2016

(65) Prior Publication Data
US 2018/0083295 A1 Mar. 22, 2018

(30) Foreign Application Priority Data
Mar. 31, 2015 (JP) .................... 2015-071327

(51) Int. Cl.
*H01M 8/02* (2016.01)
*H01M 8/04* (2016.01)
(Continued)

(52) U.S. Cl.
CPC ....... *H01M 8/0221* (2013.01); *H01M 8/0202* (2013.01); *H01M 8/0206* (2013.01);
(Continued)

(58) Field of Classification Search
CPC .................. H01M 8/0202–8/0286
See application file for complete search history.

(56) References Cited

U.S. PATENT DOCUMENTS 9,269,967 B2  2/2016 Masaka et al.
2002/0102453 A1* 8/2002 Suenaga ............. H01M 8/0273
429/465
(Continued)

FOREIGN PATENT DOCUMENTS

JP       3532547 B2    5/2004
JP    2004-178978 A    6/2004
(Continued)

OTHER PUBLICATIONS

PCT/ISA/210 from PCT/JP2016/058939 with the English translation thereof.

*Primary Examiner* — Jonathan G Leong
*Assistant Examiner* — Jacob Buchanan
(74) *Attorney, Agent, or Firm* — Carrier Blackman & Associates, P.C.; Joseph P. Carrier; Jeffrey T. Gedeon

(57) ABSTRACT

A unit cell that constitutes a fuel cell stack is obtained by sandwiching an electrolyte mem-brane/electrode structure with a cathode-side separator and an anode-side separator. A first resin member is provided along the entire periphery of the cathode-side separator in the outer peripheral portion of the cathode-side separator. Surfaces of the cathode-side (Continued)

separator are provided with sealing parts that cover a part of the first resin member and constitute a first sealing member.

10 Claims, 7 Drawing Sheets

(51) Int. Cl.
| | |
|---|---|
| *H01M 8/0221* | (2016.01) |
| *H01M 8/0202* | (2016.01) |
| *H01M 8/0271* | (2016.01) |
| *H01M 8/04082* | (2016.01) |
| *H01M 8/1018* | (2016.01) |
| *H01M 8/0206* | (2016.01) |
| *H01M 8/0273* | (2016.01) |
| *H01M 8/0276* | (2016.01) |
| *H01M 8/0286* | (2016.01) |
| *H01M 8/10* | (2016.01) |
| *H01M 8/0267* | (2016.01) |
| *H01M 8/0284* | (2016.01) |

(52) U.S. Cl.
CPC ....... *H01M 8/0271* (2013.01); *H01M 8/0273* (2013.01); *H01M 8/0276* (2013.01); *H01M 8/0286* (2013.01); *H01M 8/04201* (2013.01); *H01M 8/1018* (2013.01); *H01M 8/0267* (2013.01); *H01M 8/0284* (2013.01); *H01M 8/10* (2013.01); *H01M 2008/1095* (2013.01); *H01M 2250/20* (2013.01); *Y02T 90/32* (2013.01)

(56) References Cited

U.S. PATENT DOCUMENTS

| | | | |
|---|---|---|---|
| 2002/0117780 A1 | 8/2002 | Inoue et al. | |
| 2002/0150810 A1* | 10/2002 | Mizuno | H01M 8/0271 429/434 |
| 2005/0118484 A1* | 6/2005 | Kawachi | H01M 8/0206 429/509 |
| 2007/0065712 A1* | 3/2007 | Wada | B01D 39/12 429/492 |
| 2007/0231662 A1* | 10/2007 | Goto | H01M 8/0206 429/482 |
| 2008/0230936 A1* | 9/2008 | Takada | H01M 8/0273 264/40.1 |

FOREIGN PATENT DOCUMENTS

| | | |
|---|---|---|
| JP | 2012-021640 A | 2/2012 |
| JP | 2013-157095 A | 8/2013 |
| JP | 2013-179071 A | 9/2013 |
| JP | 2014-203553 A | 10/2014 |
| JP | 2014-229366 A | 12/2014 |
| JP | 2015-005497 A | 1/2015 |

* cited by examiner

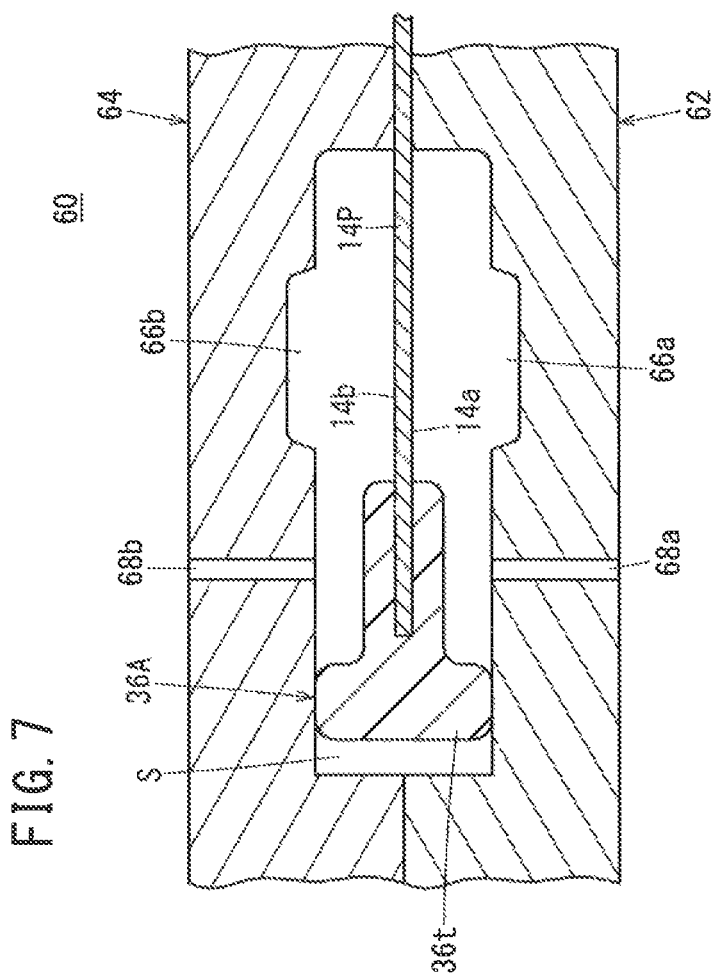

SEPARATOR FOR FUEL CELLS AND METHOD FOR PRODUCING SAME

TECHNICAL FIELD

The present invention relates to a fuel cell separator of a fuel cell and a method of producing the fuel cell separator (separator for fuel cells and method for producing same). In the fuel cell, a membrane electrode assembly is sandwiched between separators, and seal members are formed integrally with outer ends of the separators. The membrane electrode assembly includes electrodes and an electrolyte membrane interposed between the electrodes.

BACKGROUND ART

For example, in a solid polymer electrolyte fuel cell, an electrolyte membrane (polymer ion exchange membrane) is interposed between an anode and a cathode to form a membrane electrode assembly (MEA). The membrane electrode assembly is sandwiched between a pair of separators to form a unit cell (power generation cell). In use, in the fuel cell, generally, a predetermined number of unit cells are stacked together to form a fuel cell stack, e.g., mounted in a fuel cell vehicle.

In the fuel cell, a fuel gas flow field is provided in one surface of the separator facing an anode, for supplying a fuel gas to the anode, and an oxygen-containing gas flow field is provided in the other surface of the separator facing a cathode, for supplying an oxygen-containing gas to the cathode. Further, a coolant flow field is formed between the adjacent separators of each fuel cell, for supplying a coolant within an electrode area along surfaces of the separators.

Further, in the fuel cell, so called internal manifold structure is often adopted. In the internal manifold structure, fuel gas passages, oxygen-containing gas passages, and coolant passages extend through the unit cells in the stacking direction for allowing the fuel gas, the oxygen-containing gas, and the coolant to flow through the unit cells.

In this internal manifold type fuel cell, seals need to be provided in an air-tight manner or a liquid-tight manner for preventing leakage of the fuel gas, the oxygen-containing gas, and the coolant. In this regard, for example, a method for fabricating a seal-integrated separator disclosed in Japanese Patent No. 3532547 is known.

In this production method, a separator body is held between an upper mold and a lower mold. In this state, melted seal material is injected into each of grooves in the upper mold and the lower mold through separate gates, respectively, to form the seal material integrally and simultaneously on both surfaces of the separator body. Therefore, according to the disclosure, in comparison with the case of providing seal material separate from the separator body on both front and back surfaces of the separator body and the case of coating the seal material on the separator body, the seal material can be positioned highly accurately, and the number of assembling steps is reduced greatly.

SUMMARY OF INVENTION

Normally, in the state where the separator is held between the upper mold and the lower mold, when a melted seal member is supplied, burrs tend to be produced easily along surfaces of the molds facing each other. Consequently, after the seal-integrated separator is produced, working operation for removing the burrs at the outer end of the separator is required. Therefore, a larger number of working steps are required, and the production cost becomes high. Further, improvement in the overall work efficiency may not be achieved easily.

The present invention has been made to solve the problem of this type, and an object of the present invention is to provide a fuel cell separator and a method of producing the fuel cell separator in which, with the simple structure and steps, it is possible to reliably suppress production of burrs at the outer end of a seal member, achieve improvement in the work efficiency, and produce the fuel cell separator economically.

In a fuel cell separator according to the present invention, a membrane electrode assembly is sandwiched between the fuel cell separators. The membrane electrode assembly includes electrodes and an electrolyte membrane interposed between the electrodes. A seal member is formed integrally with an outer end of the fuel cell separator. A fluid passage is formed in a surface of the fuel cell separator for allowing at least a fuel gas, an oxygen-containing gas, or a coolant as fluid to flow in a stacking direction in which the fuel cell separator and the membrane electrode assembly are stacked together.

A resin member covering part of the resin member is provided at an outer end of the fuel cell separator, outside the fluid passage, over the entire perimeter of the fuel cell separator, and the seal member is provided on both surfaces of the fuel cell separator. The expression "over the entire perimeter" herein includes the case where the cutout is formed in only part of the outer end of the separator.

Further, a method of producing a fuel cell separator according to the invention of the present application includes the step of providing a resin member at an outer end of the fuel cell separator, outside the fluid passage, over the entire perimeter of the fuel cell separator. Further, this production method includes the step of supplying a melted seal member in a state where the resin member is held between a pair of molds to form the seal member covering part of the resin member, on both surfaces of the fuel cell separator.

In the present invention, the resin member is provided over the entire perimeter of the fuel cell separator, and the seal member covering part of the resin member is provided on both surfaces of the fuel cell separator. In the structure, in the state where the resin member is held between the pair of molds, the melted seal member is supplied to form the seal member on both surfaces of the fuel cell separator. Therefore, it becomes possible to prevent burrs of the seal member from being produced at the outer end of the fuel cell separator as much as possible.

Thus, with the simple structure and steps, it becomes possible to reliably suppress production of burrs at the end of the seal member, improve the work efficiency, and produce the fuel cell separator economically.

BRIEF DESCRIPTION OF DRAWINGS

FIG. 7 is a view schematically showing a seal member forming apparatus for forming a seal member on the metal plate.

DESCRIPTION OF EMBODIMENTS

Figure 1:
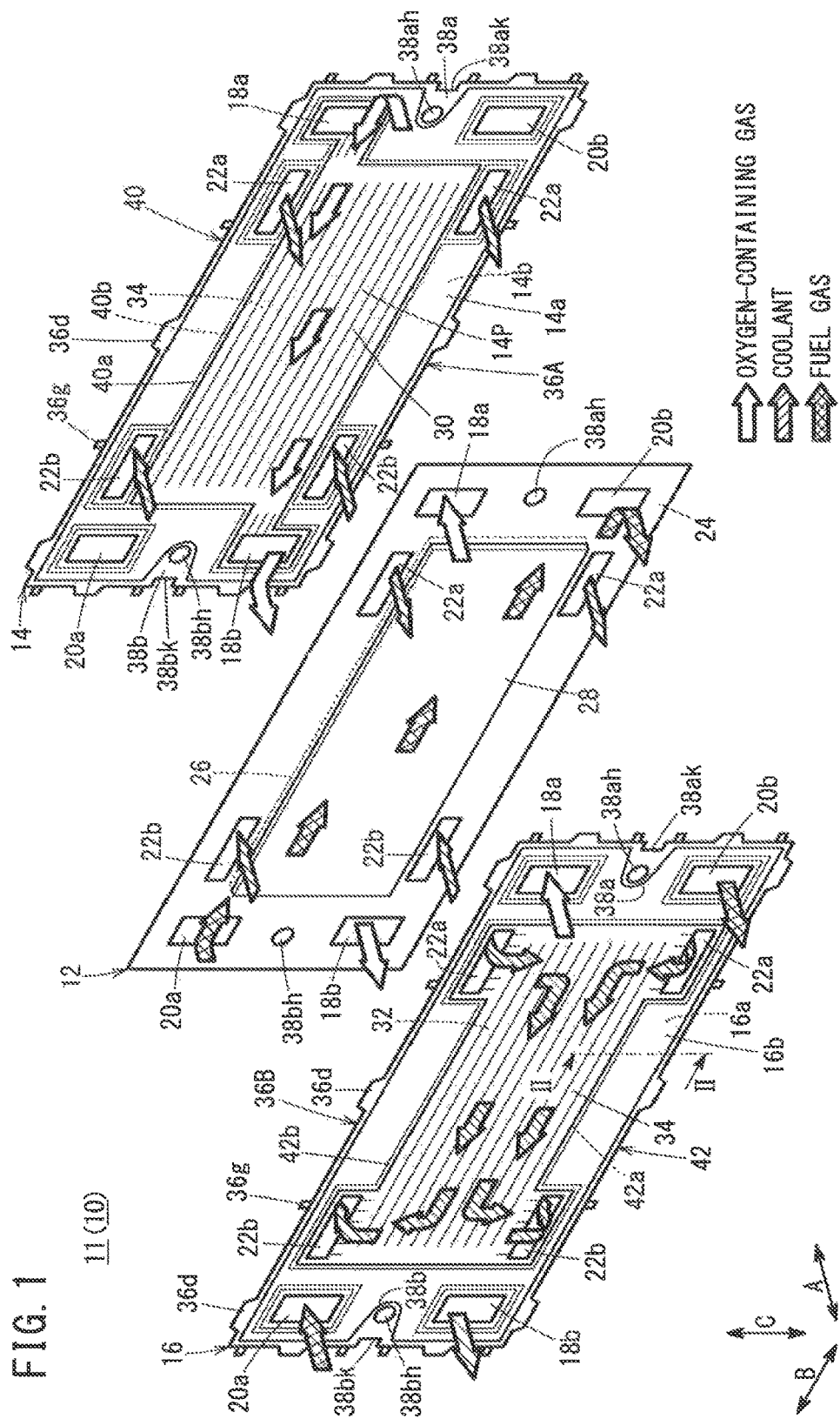
FIG. 1 is an exploded perspective view showing a unit cell including a fuel cell separator according to an embodiment of the present invention.
Figure 2:
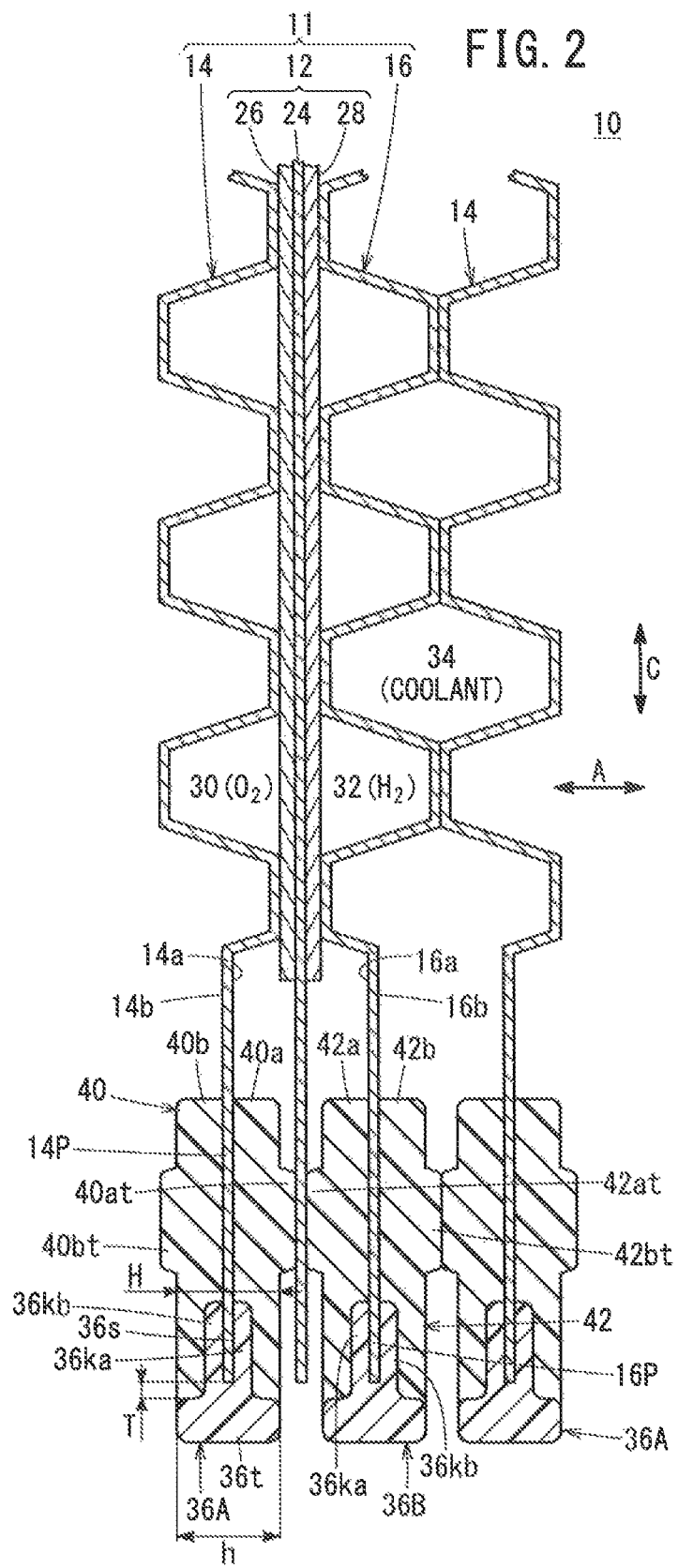
FIG. 2 is a cross sectional view showing the unit cell, taken along a line II-II in FIG. 1.

As shown in FIGS. 1 and 2, a fuel cell stack 10 including a fuel cell separator according to an embodiment of the present invention is formed by stacking laterally elongated units of fuel cells 11 (hereinafter referred to as the unit cells 11), upright (such that electrode surfaces stand vertically in parallel), in a horizontal direction indicated by an arrow A. Alternatively, longitudinally elongated unit cells 11 standing upright may be stacked together in the direction indicated by the arrow A, or lying in the horizontal direction may be stacked in the gravity direction indicated by an arrow C.

Each of the unit cells 11 includes a membrane electrode assembly 12, and a cathode side separator (fuel cell separator) 14 and an anode side separator (fuel cell separator) 16 sandwiching the membrane electrode assembly 12.

The cathode side separator 14 and the anode side separator 16 are, for example, steel plates, stainless steel plates, aluminum plates, plated steel plates, or thin plate metal separators having anti-corrosive surfaces by surface treatment. These metal separators have rectangular surfaces, and formed by press forming to have a corrugated shape (ridges and grooves) in cross section. Instead of the metal separators for the cathode side separator 14 and the anode side separator 16, for example, carbon separators may be used.

The cathode side separator 14 and the anode side separator 16 have a laterally elongated shape including short sides extending in a gravity direction indicated by an arrow C and long sides extending in a horizontal direction indicated by an arrow B. Alternatively, the short sides may extend in the horizontal direction and the long sides may extend in the gravity direction.

As shown in FIG. 1, at one end of the unit cells 11 in a longitudinal direction indicated by the arrow B, an oxygen-containing gas supply passage (fluid passage) 18a and a fuel gas discharge passage (fluid passage) 20b are provided. The oxygen-containing gas supply passages 18a and the fuel gas discharge passages 20b extend through the unit cells 11 in the direction indicated by the arrow A. An oxygen-containing gas is supplied to the unit cells 11 through the oxygen-containing gas supply passage 18a, and a fuel gas such as a hydrogen-containing gas is discharged from the unit cells 11 through the fuel gas discharge passage 20b. For example, the oxygen-containing gas supply passage 18a and the fuel gas discharge passage 20b have a substantially rectangular opening shape. It should be noted that the oxygen-containing gas supply passage 18a and the fuel gas discharge passage 20b may have a triangular or polygonal opening shape.

At the other end of the unit cells 11 in the longitudinal direction, a fuel gas supply passage (fluid passage) 20a for supplying the fuel gas and an oxygen-containing gas discharge passage (fluid gas passage) 18b for discharging the oxygen-containing gas are provided. The oxygen-containing gas discharge passage 18b and the fuel gas supply passage 20a have a substantially rectangular opening shape. It should be noted oxygen-containing gas discharge passage 18b and the fuel gas supply passage 20a may have a triangular or polygonal opening shape.

A pair of coolant supply passages 22a for supplying a coolant is provided at upper and lower marginal portions of the unit cell 11 in the lateral direction indicated by the arrow C. In the longitudinal direction, the marginal portions are provided on one side closer to the oxygen-containing gas supply passage 18a. The coolant supply passages 22a communicate with each other in the direction indicated by the arrow A. A pair of coolant discharge passages 22b for discharging a coolant is provided at upper and lower marginal portions of the unit cell 11 in the lateral direction. In the longitudinal direction, the marginal portions are provided on one side closer to the fuel gas supply passage 20a.

The pair of coolant supply passages 22a have a substantially rectangular opening shape elongated in the flow direction of the coolant flow field 34 indicated by arrow B. The pair of coolant discharge passages 22b have a substantially rectangular opening shape elongated in the flow direction of the coolant flow field 34 indicated by the arrow B.

As shown in FIGS. 1 and 2, the membrane electrode assembly 12 includes a cathode 26, an anode 28, and a fluorine based or hydrocarbon based solid polymer electrolyte membrane 24 interposed between the cathode 26 and the anode 28.

Each of the cathode 26 and the anode 28 has a gas diffusion layer (not shown) such as a carbon paper, and an electrode catalyst layer (not shown) that is made up from porous carbon particles supporting platinum alloy on the surface thereof. The carbon particles are deposited uniformly on the surface of the gas diffusion layer. The electrode catalyst layer of the cathode 26 and the electrode catalyst layer of the anode 28 are fixed to both surfaces of the solid polymer electrolyte membrane 24, respectively.

As shown in FIG. 1, the cathode side separator 14 has an oxygen-containing gas flow field 30 on its surface 14a facing the membrane electrode assembly 12. The oxygen-containing gas flow field 30 is connected to the oxygen-containing gas supply passage 18a and the oxygen-containing gas discharge passage 18b. The oxygen-containing gas flow field 30 includes a plurality of straight (or wavy) flow grooves extending in the horizontal direction indicated by the arrow B for allowing the oxygen-containing gas to flow toward one side in the longitudinal direction along the separator surface.

The anode side separator 16 has a fuel gas flow field 32 on its surface 16a facing the membrane electrode assembly 12. The fuel gas flow field 32 is connected to the fuel gas supply passage 20a and the fuel gas discharge passage 20b. The fuel gas flow field 32 includes a plurality of straight (or wavy) flow grooves extending in the horizontal direction indicated by the arrow B for allowing the fuel gas to flow toward the other side in the longitudinal direction along the separator surface.

A coolant flow field 34 is formed between the surface 16b of the anode side separator 16 and the surface 14b of the cathode side separator 14 that are adjacent to each other. The coolant flow field 34 is connected to the coolant supply passages 22a and the coolant discharge passages 22b. In the coolant flow field 34, the coolant flows over the electrode area of the membrane electrode assembly 12. In the anode side separator 16, the coolant flow field 34 is the back of the fuel gas flow field 32. In the cathode side separator 14, the coolant flow field 34 is the back of the oxygen-containing gas flow field 30.

As shown in FIG. 2, a first resin member 36A is formed integrally with the surfaces 14a, 14b of the cathode side separator 14, covering the outer end of and extending along the edge of the outer end of a metal plate 14P (see FIG. 2) of the cathode side separator 14. The first resin member 36A is formed over the entire perimeter of the cathode side separator 14. The first resin member 36A is provided outside the oxygen-containing gas supply passage 18a, the oxygen-containing gas discharge passage 18b, the fuel gas supply passage 20a, the fuel gas discharge passage 20b, the coolant supply passage 22a, and the coolant discharge passage 22b. Part of the outer end of the cathode side separator 14 alone may be cut off the first resin member 36A.

Figure 3:
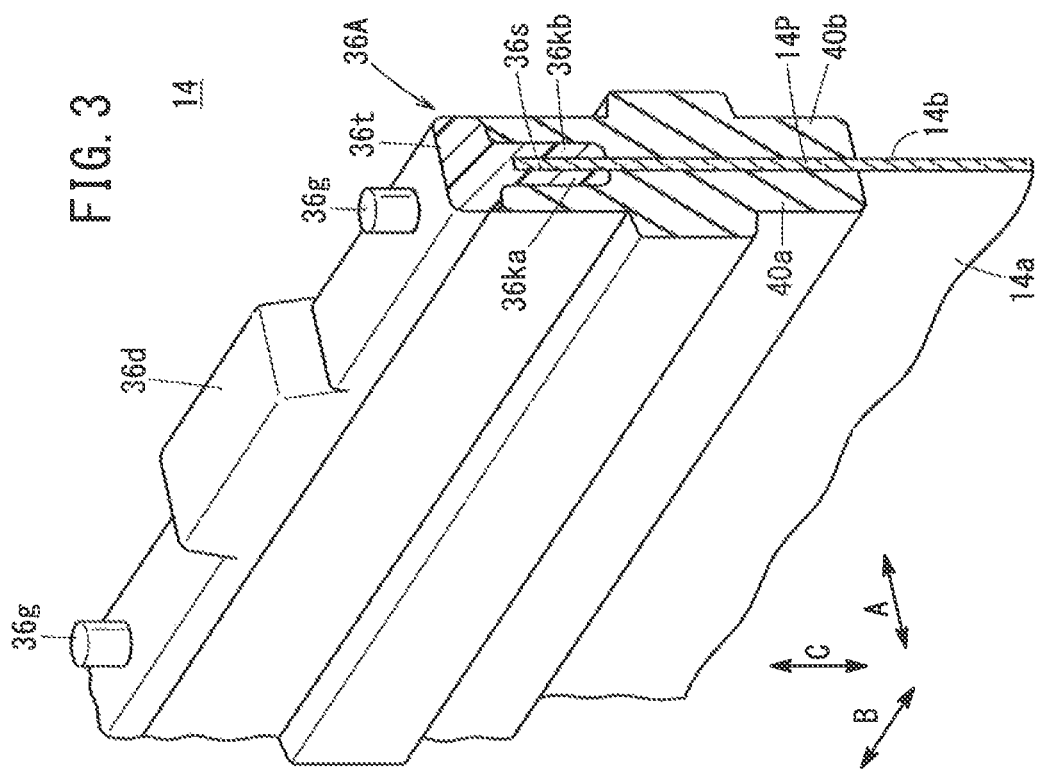
FIG. 3 is a partial perspective view showing a cathode side separator of the unit cell.

As shown in FIGS. 2 and 3, the first resin member 36A has a slit 36s at its center, and an end of the metal plate 14P is inserted into the slit 36s. The first resin member 36A has a substantially T-like frame shape in cross section. The first resin member 36A is positioned outside the outer end of the cathode side separator 14, and includes a protrusion 36t, e.g., having a substantially rectangular shape in cross section. A pair of overlapping portions 36ka, 36kb is formed integrally with the inside of the protrusion 36t. The overlapping portions 36ka, 36kb extend in parallel along both surfaces 14a, 14b of the cathode side separator 14, and the overlapping portions 36ka, 36kb are overlapped with seals 40a, 40b in the stacking direction. The seals 40a, 40b are described later.

The slit 36s is terminated inside the protrusion 36t at a length (depth) of T. The outermost circumference of the metal plate 14P is placed inside the protrusion 36t. As described later, at the time of forming the first seal member 40 by a seal member forming apparatus 60, the first resin member 36A is held between a pair of seal member forming molds 62, 64. However, since the metal plate 14P is spaced inward by the distance T, the metal plate 14P is not held between the seal member forming molds 62, 64. Therefore, the metal plate 14P will never be deformed.

As shown in FIG. 3, a plurality of resin flow sections 36g are provided at arbitrary positions of the first resin member 36A. The resin flow sections 36g are solidified in a gate 58 for forming the resin member which is described later. Between the adjacent resin flow sections 36g, provided is an expansion 36d that covers a welding line position and protrudes outward in a direction parallel to the separator surface. Preferably, the expansion 36d is provided at an intermediate position between the resin flow sections 36g, has a predetermined width, and is a trapezoid having slopes on both sides.

In the first resin member 36A, resin knock sections 38a, 38b are formed integrally with the first resin member 36A, between the oxygen-containing gas supply passage 18a and the fuel gas discharge passage 20b, and between the fuel gas supply passage 20a and the oxygen-containing gas discharge passage 18b. Knock holes 38ah, 38bh passes through the resin knock sections 38a, 38b. Knock pins (not shown) are inserted into the knock holes 38ah, 38bh. The resin knock sections 38a, 38b have cutouts 38ak, 38bk, if need be. The knock holes 38ah, 38bh pass through the solid polymer electrolyte membrane 24.

For example, the first resin member 36A is made of PPS (polyphenylene sulfide), PPA (polyphthalamide), PEN (polyethylene naphtalate), PES (polyethersulfone), LCP (liquid crystal polymer), PVDF (polyvinylidene difluoride), silicone resin, fluororesin, m-PPE (modified polyphenylene ether resin). Alternatively, the first resin member 36A may be made of PET (polyethylene terephthalate), PBT (polybutylene terephthalate), or modified polyolefin. Preferably, the first resin member 36A is made of thermoplastic resin.

A second resin member 36B is formed integrally with the surfaces 16a, 16b of the anode side separator 16, covering the outer end of and extending along the edge of the outer end of the metal plate 16P (see FIG. 2) of the anode side separator 16. The second resin member 36B has the same structure as the first resin member 36A. The constituent elements of the second resin member 36B that are identical to those of the first resin member 36A are labeled with the same reference numeral, and detailed description thereof is omitted.

A first seal member 40 is formed integrally with the cathode side separator 14. The first seal member 40 includes a seal 40a formed integrally with the surface 14a of the cathode side separator 14, and a seal 40b formed integrally with the surface 14b of the cathode side separator 14. The outer end of the seal 40a is overlapped with the overlapping portion 36ka of the first resin member 36A in the stacking direction, and the outer end of the seal 40b is overlapped with the overlapping portion 36kb of the first resin member 36A in the stacking direction. No steps are present between the outer ends of the seals 40a, 40b and both end surfaces of the protrusion 36t in the thickness direction. That is, the outer ends of the seals 40a, 40b and both end surfaces of the protrusion 36t in the thickness direction are continuously flat along the separator surfaces.

The seals 40a, 40b are flat seals having a constant thickness, extending along the separator surfaces, and part of the flat seals includes ridge seals 40at, 40bt. As shown in FIG. 2, the thickness h of the protrusion 36t of the first resin member 36A and the thickness H of the first seal member 40 are the same (h=H). The thickness h of the protrusion 36t is the same as the thickness of the resin knock sections 38a, 38b.

A second seal member 42 is formed integrally with the anode side separator 16. The second seal member 42 includes a seal 42a formed integrally with the surface 16a of the anode side separator 16, and a seal 42b formed integrally with the surface 16b of the anode side separator 16. The outer end of the seal 42a is overlapped with the overlapping portion 36ka of the second resin member 36B in the stacking direction, and the outer end of the seal 42b is overlapped with the overlapping portion 36kb of the second resin member 36B in the stacking direction. The seals 42a, 42b are flat seals extending along the separator surfaces with a constant thickness, and part of the flat seals includes ridge seals 42at, 42bt.

Each of the first seal member 40 and the second seal member 42 is, for example, an elastic seal member made of seal material, cushion material, or packing material such as an EPDM, an NBR, a fluoro rubber, a silicone rubber, a fluorosilicone rubber, a Butyl rubber, a natural rubber, a styrene rubber, a chloroprene rubber, or an acrylic rubber.

Next, a method of producing the cathode side separator 14 will be described below. It should be noted that the anode side separator 16 is produced in the same manner as the cathode side separator 14. Therefore, detailed description of the anode side separator 16 is omitted.

Figure 4:
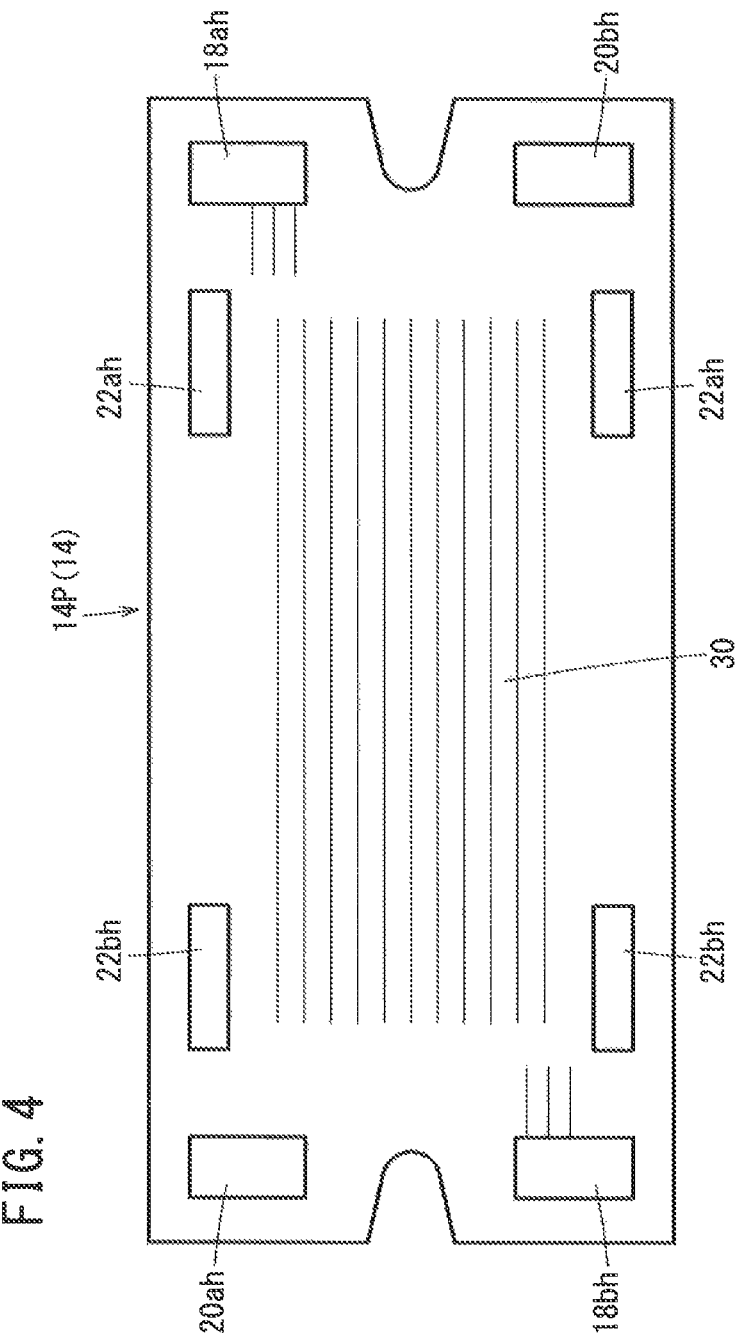
FIG. 4 is a front view showing a metal plate of the cathode side separator.

Firstly, as shown in FIG. 4, the metal plate 14P of the cathode side separator 14 is produced by press forming. Holes 18ah, 18bh, 20ah, 20bh, 22ah, and 22bh corresponding to the oxygen-containing gas supply passage 18a, the oxygen-containing gas discharge passage 18b, the fuel gas supply passage 20a, the fuel gas discharge passage 20b, the coolant supply passage 22a, and the coolant discharge passage 22b are formed in the metal plate 14P. The oxygen-containing gas flow field 30 is formed in the metal plate 14P by press forming.

Figure 5:
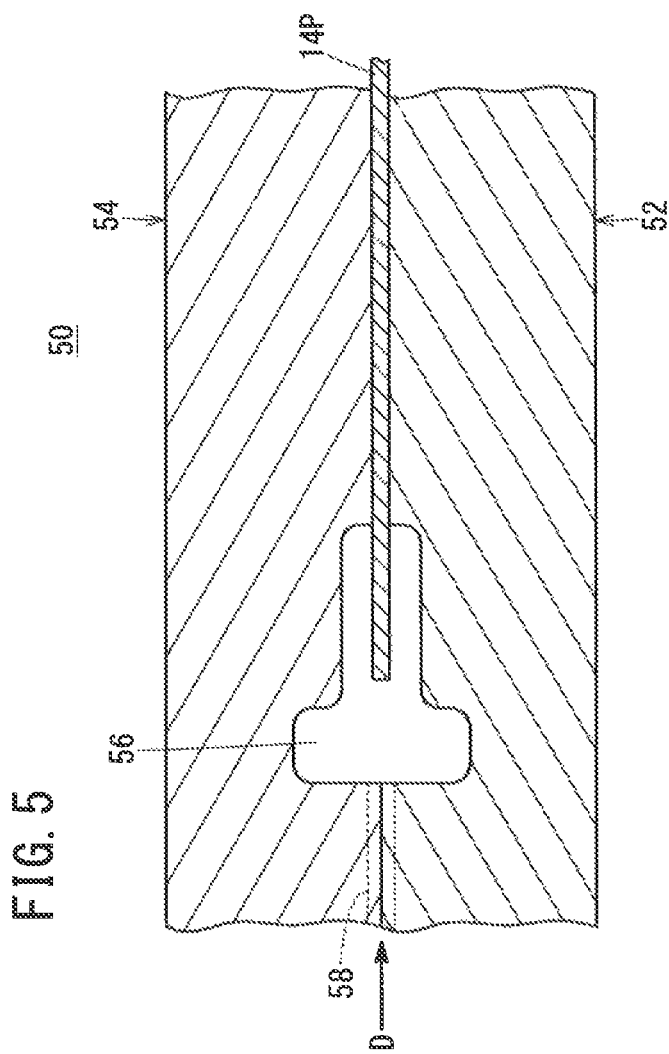
FIG. 5 is a perspective view showing a resin member forming apparatus for forming a resin member on the metal plate.

Then, as shown in FIG. 5, the metal plate 14P is held between the pair of resin member forming molds 52, 54 of the resin member forming apparatus 50. When the resin member forming molds 52, 54 are closed, a cavity 56 corresponding to the shape of the first resin member 36A is formed between the resin member forming molds 52, 54. A plurality of gates 58 are connected to the cavity 56 for supplying melted resin to be formed into the resin member (hereinafter referred to as the melted resin member) in a direction parallel to surfaces of the resin member forming molds 52, 54 facing each other, indicated by an arrow D. The cavity 56 includes a recess (not shown) corresponding to the shape of the expansion 36d (see FIG. 3) between the gates 58.

Figure 6:
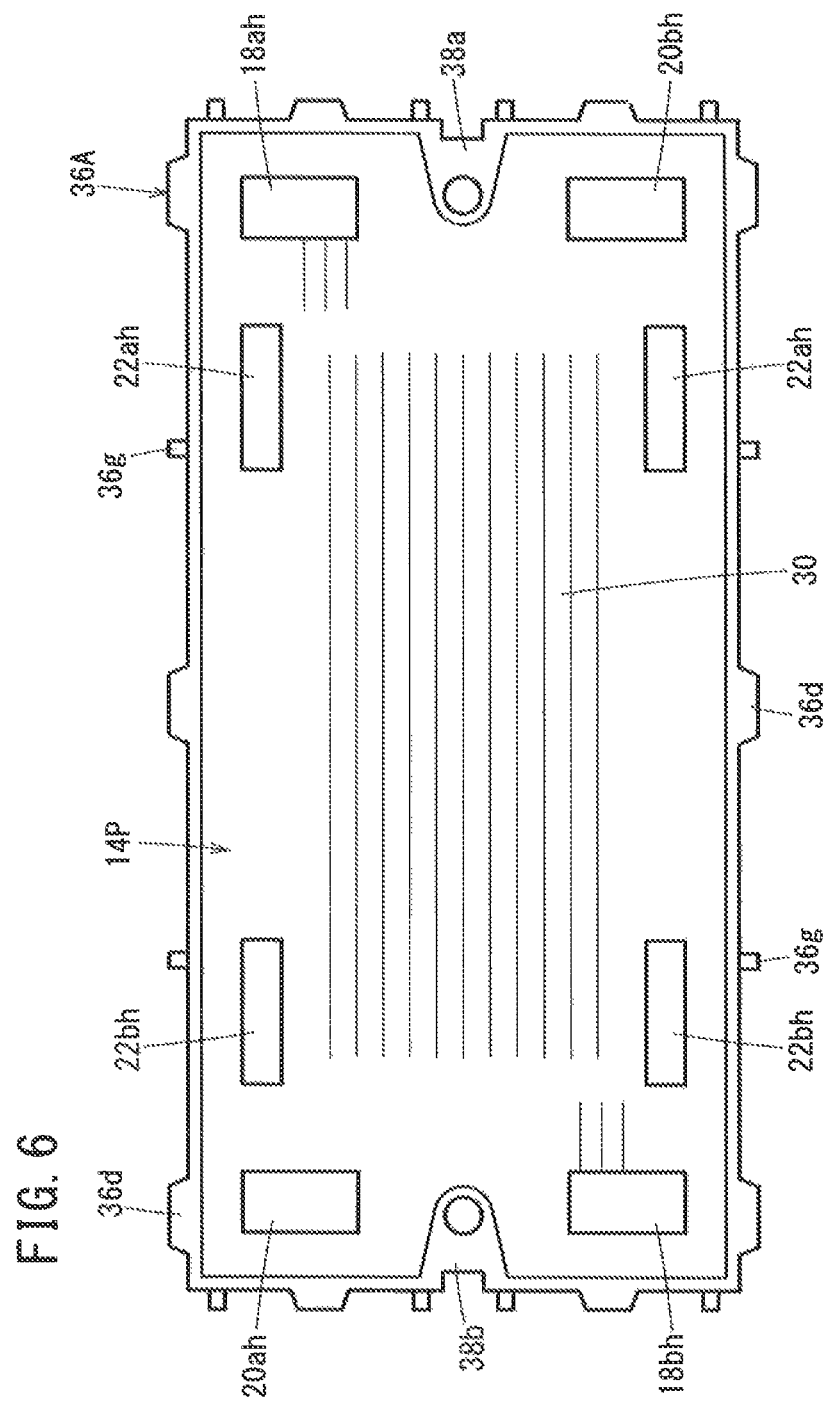
FIG. 6 is a front view showing a state where the metal plate and the resin member are joined together integrally.

In the structure, by filling the melted resin member into the cavity 56 from the gates 58, the first resin member 36A is formed integrally with the edge of the outer end of the metal plate 14P. The metal plate 14P formed integrally with the first resin member 36A is collected from the resin member forming apparatus 50 (see FIG. 6). Thereafter, the resin flow sections 36g are removed from the first resin member 36A, e.g., using a cutter or the like.

As shown in FIG. 7, the first resin member 36A is formed integrally with the metal plate 14P, and the metal plate 14P is held between the pair of seal member forming molds 62, 64 of the seal member forming apparatus 60. A cavity 66a is formed between the seal member forming mold 62 and the metal plate 14P. The seal 40a of the first seal member 40 is formed by the cavity 66a. A plurality of gates 68a formed in the seal member forming mold 62 communicate with the cavity 66a.

A cavity 66b is formed between the seal member forming mold 64 and the metal plate 14P. The seal 40b of the first seal member 40 is formed by the cavity 66b. A plurality of gates 68b formed in the seal member forming mold 64 communicate with the cavity 66b.

The metal plate 14P is held between the seal member forming molds 62, 64, and the protrusion 36t of the first resin member 36A is pressed and held between the seal member forming molds 62, 64. Both end surfaces of the protrusion 36t in the thickness direction contact the inner surfaces of the seal member forming molds 62, 64. A predetermined gap S is formed between the outer end surface of the protrusion 36t and the inner surfaces of the seal member forming molds 62, 64.

In this state, the melted seal member poured from the gates 68a, 68b is filled into the cavities 66a, 66b. Therefore, the seal 40a is formed integrally with the surface 14a of the metal plate 14P, and the seal 40b is formed integrally with the surface 14b of the metal plate 14P. Consequently, the cathode side separator 14 is produced. The seals 40a, 40b are parts of the first seal member 40. For example, as the seals 40a, 40b, elastic seal members of seal material, cushion material, or packing material such as an EPDM, an NBR, a fluoro rubber, a silicone rubber, a fluorosilicone rubber, a Butyl rubber, a natural rubber, a styrene rubber, a chloroprene rubber, or an acrylic rubber are used.

In the embodiment of the present invention, firstly, the first resin member 36A is formed integrally with the outer end of the metal plate 14P over the entire perimeter on both surfaces of the metal plate 14P. Further, the seals 40a, 40b of the first seal member 40 are formed integrally with both surfaces 14a, 14b of the metal plate 14P.

Specifically, as shown in FIG. 7, the protrusion 36t of the first resin member 36A is pressed and held between the seal member forming molds 62, 64. In this state, the melted seal member is supplied into the cavities 66a, 66b. Therefore, the first seal member 40 is formed integrally with the metal plate 14P. In the structure, it is possible to effectively prevent burrs of the first seal member 40 from being produced at the outer end of the metal plate 14P.

In particular, the protrusion 36t is held firmly such that the protrusion 36t is collapsed between the seal member forming molds 62, 64. Therefore, at the time of forming the seal member, it becomes possible to prevent burrs from being produced as much as possible. Further, the front end of the metal plate 14P, i.e., the protrusion 36t can be held reliably. Therefore, the melted seal member can be filled into the cavities 66a, 66b at high pressure. Accordingly, improvement in the performance of forming the first seal member 40 is achieved. The melted seal member flows smoothly, and improvement in the work efficiency of forming the first seal member 40 is achieved easily.

Therefore, in the embodiment of the present invention, with the simple structure and steps, it becomes possible to reliably suppress production of burrs at the outer end of the first seal member 40, achieve improvement in the work efficiency, and achieve economical production.

Further, the seals 40a, 40b of the first seal member 40 are overlapped with the overlapping portions 36ka, 36kb of the first resin member 36A. In the structure, since the joining areas between the seals 40a, 40b and the overlapping portions 36ka, 36kb are large, the seals 40a, 40b and the overlapping portions 36ka, 36kb are securely and reliably adhered together. The first seal member 40 can securely hold the first resin member 36A, and it becomes possible to prevent the first seal member 40 and the first resin member 36A from being separated from each other.

Further, in the first resin member 36A, the expansion 36d covering the welding line position is provided and protrudes outward in a direction parallel to the separator surfaces, between the resin flow sections 36g. In the structure, it becomes possible to reliably maintain the overall strength of the first resin member 36A.

Furthermore, the outer end of the cathode side separator 14 is covered by the protrusion 36t of the first resin member 36A. In the structure, in comparison with the case of using rubber members, when an external load is applied to the cathode side separator 14 from the outside in a direction parallel to the separator surface, it is possible to receive the external load better than the rubber members and reliably protect the cathode side separator 14.

Operation of the fuel cell stack 10 will be described below.

Firstly, as shown in FIG. 1, an oxygen-containing gas is supplied to the oxygen-containing gas supply passage 18a, and a fuel gas such as a hydrogen-containing gas is supplied to the fuel gas supply passage 20a. Further, a coolant such as pure water, ethylene glycol or oil is supplied to the pair of coolant supply passages 22a.

In the structure, the oxygen-containing gas is supplied from the oxygen-containing gas supply passage 18a to the oxygen-containing gas flow field 30 of the cathode side separator 14. The oxygen-containing gas flows in the horizontal direction indicated by the arrow B along the oxygen-containing gas flow field 30, and the oxygen-containing gas is supplied to the cathode 26 of the membrane electrode assembly 12.

In the meanwhile, the fuel gas is supplied from the fuel gas supply passage 20a to the fuel gas flow field 32 of the anode side separator 16. The fuel gas flows along the fuel gas flow field 32 in the horizontal direction indicated by the arrow B, and the fuel gas is supplied to the anode 28 of the membrane electrode assembly 12.

Thus, in the membrane electrode assembly 12, the oxygen-containing gas supplied to the cathode 26 and the fuel gas supplied to the anode 28 are consumed in the electrochemical reactions at catalyst layers of the cathode 26 and the anode 28 for generating electricity.

Then, the oxygen-containing gas supplied to, and partially consumed at the cathode 26 of the membrane electrode assembly 12 is discharged along the oxygen-containing gas discharge passage 18b in the direction indicated by the arrow A. The fuel gas supplied to, and partially consumed at the anode 28 of the membrane electrode assembly 12 is discharged along the fuel gas discharge passage 20b in the direction indicated by the arrow A.

Further, the coolant supplied to the pair of coolant supply passages 22a flows into the coolant flow field 34 between the cathode side separator 14 and the anode side separator 16. After the coolant temporarily flows inward in the gravity direction indicated by the arrow C, the coolant moves in the horizontal direction indicated by the arrow B, and cools the membrane electrode assembly 12. After that, the coolant moves outward in the direction indicated by the arrow C, and then, the coolant is discharged to the pair of the coolant discharge passages 22b.

The invention claimed is:

1. A fuel cell separator, sandwiching a membrane electrode assembly including electrodes and an electrolyte membrane interposed between the electrodes, an outer end of the fuel cell separator being formed integrally with a seal member formed of an elastic material, and a fluid passage being formed in a surface of the fuel cell separator for allowing at least a fuel gas, an oxygen-containing gas, or a coolant as fluid to flow in a stacking direction in which the fuel cell separator and the membrane electrode assembly are stacked together,
   wherein a resin member is provided at an outer end of the fuel cell separator, outside the fluid passage, and over an entire perimeter of the fuel cell separator;
   wherein the seal member covering part of the resin member is provided on both surfaces of the fuel cell separator;
   wherein the seal member includes a ridge seal protruding farther than the resin member in a thickness direction of the fuel cell separator;
   wherein the seal member is arranged on an inner side of the resin member;
   wherein the fuel cell separator includes a gas flow field facing an electrode of the electrodes to allow the fluid to flow along the electrode;
   wherein the ridge seal is disposed between the gas flow field and the inner side of the resin member and separates the inner side of the resin member from the gas flow field; and
   wherein the resin member is positioned outside the outer end of the fuel cell separator, and the resin member includes a protrusion which protrudes in both sides in a thickness direction of the separator and is positioned outside the outer end of the fuel cell separator in the direction along which the surface of the fuel cell separator extends.

2. The fuel cell separator according to claim 1, wherein the resin member includes an overlapping portion overlapped with the outer end of the seal member in the stacking direction.

3. The fuel cell separator according to claim 1, wherein an outer edge of the fuel cell separator is positioned inside the protrusion in the direction along which the surface of the fuel cell separator extends.

4. A fuel cell separator, sandwiching a membrane electrode assembly including electrodes and an electrolyte membrane interposed between the electrodes, an outer end of the fuel cell separator being formed integrally with a seal member formed of an elastic material, and a fluid passage being formed in a surface of the fuel cell separator for allowing at least a fuel gas, an oxygen-containing gas, or a coolant as fluid to flow in a stacking direction in which the fuel cell separator and the membrane electrode assembly are stacked together,
   wherein a resin member is provided at an outer end of the fuel cell separator, outside the fluid passage, and over an entire perimeter of the fuel cell separator;
   wherein the seal member covering part of the resin member is provided on both surfaces of the fuel cell separator;
   wherein the seal member includes a ridge seal protruding farther than the resin member in a thickness direction of the fuel cell separator;
   wherein the seal member is arranged on an inner side of the resin member;
   wherein the fuel cell separator includes a gas flow field facing an electrode of the electrodes to allow the fluid to flow along the electrode;
   wherein the ridge seal is disposed between the gas flow field and the inner side of the resin member and separates the inner side of the resin member from the gas flow field;
   wherein resin flow sections for forming the resin member are provided at a plurality of positions of the resin member; and
   an expansion protruding outward in a direction parallel to a surface of the separator is provided between the adjacent resin flow sections.

5. A method of producing a fuel cell separator, sandwiching a membrane electrode assembly including electrodes and an electrolyte membrane interposed between the electrodes, an outer end of the fuel cell separator being formed integrally with a seal member formed of an elastic material, and a fluid passage being formed in a surface of the fuel cell separator for allowing at least a fuel gas, an oxygen-containing gas, or a coolant as fluid to flow in a stacking direction in which the fuel cell separator and the membrane electrode assembly are stacked together,
   the method comprising the steps of:
   providing a resin member at an outer end of the fuel cell separator, outside the fluid passage, and over an entire perimeter of the fuel cell separator; and
   supplying a melted seal member in a state where the resin member is held between a pair of molds to form the seal member covering part of the resin member on both surfaces of the fuel cell separator,
   wherein the seal member includes a ridge seal protruding farther than the resin member in a thickness direction of the fuel cell separator;
   wherein the seal member is arranged on an inner side of the resin member;
   wherein the fuel cell separator includes a gas flow field facing an electrode of the electrodes to allow the fluid to flow along the electrode; and
   wherein the ridge seal is disposed between the gas flow field and the inner side of the resin member and separates the inner side of the resin member from the gas flow field.

6. The production method according to claim 5, wherein the resin member is positioned outside the outer end of the fuel cell separator, and the resin member includes a protrusion which contacts the pair of molds and is positioned outside the outer end of the fuel cell separator in the direction along which the surface of the fuel cell separator extends.

7. The production method according to claim 5, wherein the resin member includes an overlapping portion overlapped with the outer end of the seal member in the stacking direction.

8. The production method according to claim 5, wherein, in a state where the fuel cell separator is held between a pair of resin member forming molds, a melted resin member is supplied from a direction in parallel to surfaces of the molds facing each other to form the resin member.

9. The production method according to claim 5, wherein resin flow sections for forming a resin member are provided at a plurality of positions of the resin member; and
    an expansion protruding outward in a direction parallel to the surface of the separator is provided between the adjacent resin flow sections.

10. The production method according to claim 6, wherein an outer edge of the fuel cell separator is positioned inside the protrusion in the direction along which the surface of the fuel cell separator extends.

\* \* \* \* \*